United States Patent
Andrushkiw et al.

[15] 3,643,520
[45] Feb. 22, 1972

[54] TRANSMISSION

[72] Inventors: Bohdan A. Andrushkiw, Dearborn Heights; Lynn A. Range, Detroit, both of Mich.

[73] Assignee: Chrysler Corporation, Highland Park, Mich.

[22] Filed: Apr. 20, 1970

[21] Appl. No.: 29,978

[52] U.S. Cl..................................................74/333
[51] Int. Cl..................................................F16h 3/08
[58] Field of Search......................................74/333

[56] References Cited

UNITED STATES PATENTS

| | | | |
|---|---|---|---|
| 3,202,005 | 8/1965 | Ivanchich | 74/333 |
| 3,192,788 | 7/1965 | Fodrea | 74/333 |
| 3,319,479 | 5/1967 | Iavelli et al. | 74/333 |
| 3,350,954 | 11/1967 | Ruettinger | 74/333 |

Primary Examiner—C. J. Husar
Attorney—Talburtt and Baldwin

[57] ABSTRACT

A fully synchronized four-forward-speed transmission with a reverse gear in an extension housing. The reverse gear is coupled to a constantly driven countershaft by a slideable reverse idler member. An interlock device including two levers having notches in the ends thereof into which pins are movable is also provided.

4 Claims, 6 Drawing Figures

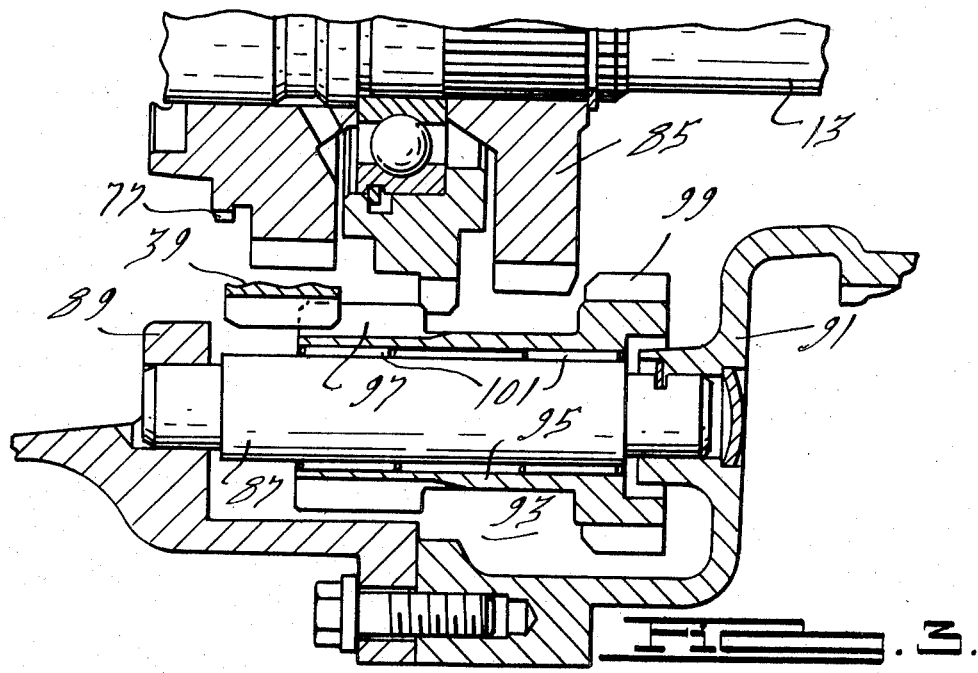
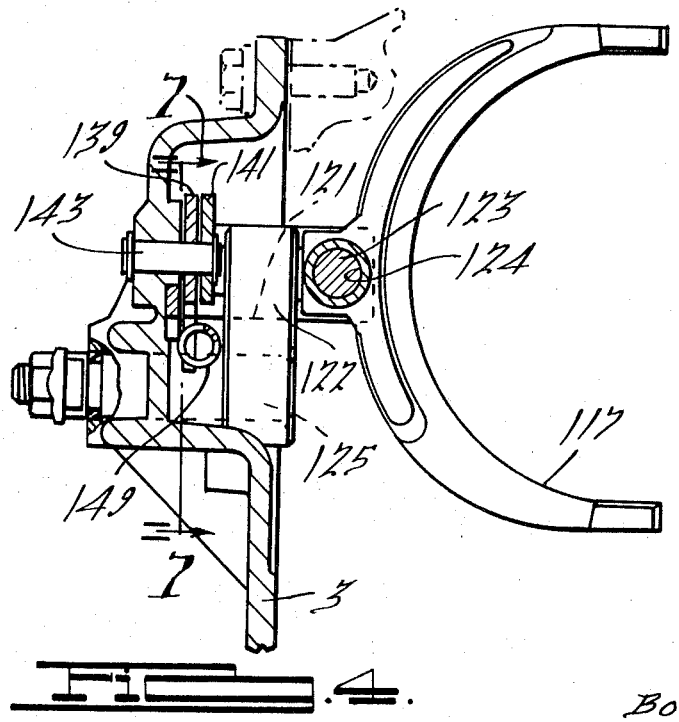

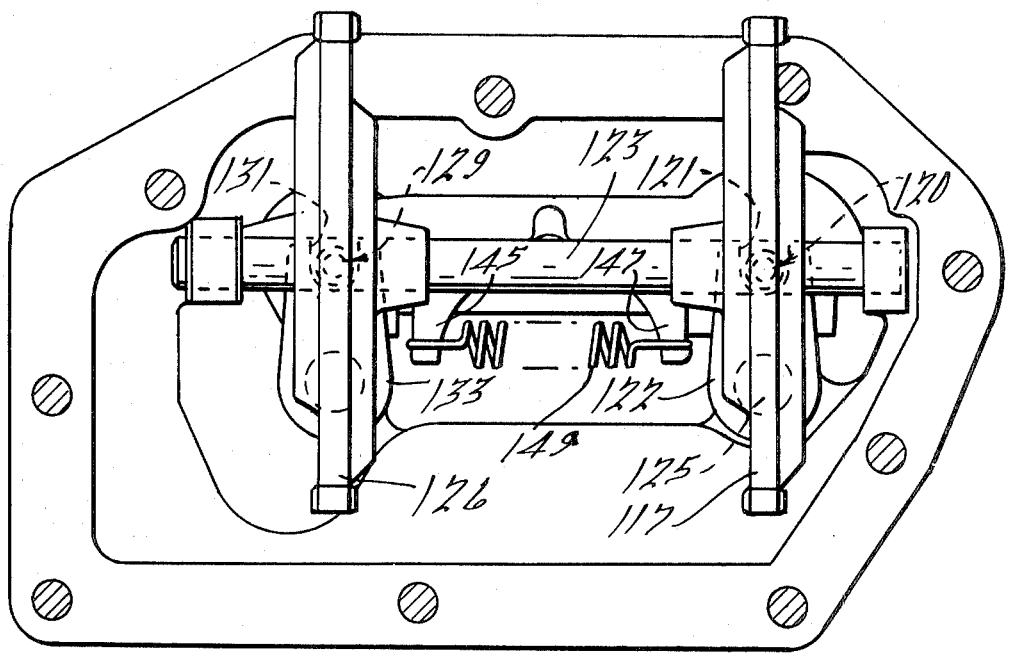
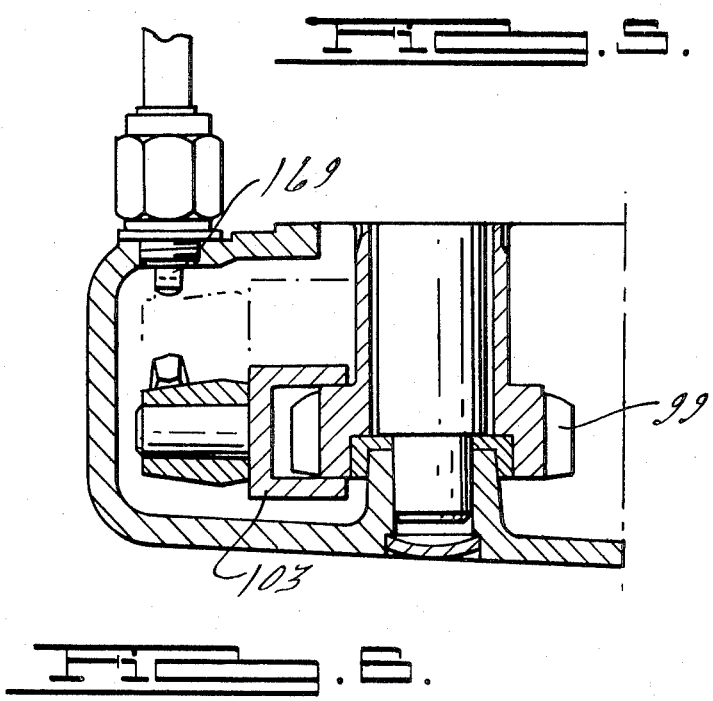

TRANSMISSION

BACKGROUND OF THE INVENTION

This invention relates generally to a multiple speed power transmission mechanism, and more particularly to a fully synchronized four-forward speed and reverse transmission having manually operated means for changing and selecting transmission speeds.

BRIEF SUMMARY OF THE INVENTION

The present transmission has an input and output shaft axially aligned. A countershaft is continuously driven by the input shaft and is adapted to be clutched through three spur gears in constant mesh with gears on the countershaft to provide for three forward speed ratios, namely first, second and third. A fourth gear or speed ratio is obtained by the direct clutching of the input shaft to the output shaft. A reverse gear is located in an extension housing located behind the main housing. A reverse countershaft is continuously driven by the first-mentioned countershaft and extends from the main housing into the extension housing. A reverse idler gear is slideably mounted on the reverse countershaft and is movable into mesh with the reverse gear to effect a reverse driving connection.

One of the primary objects of this invention is to provide a transmission in which all four forward gear ratios are adapted for synchronized engagement to facilitate shifting from one ratio to another.

Another object of this invention is to provide a transmission of the type described which has an extension housing for a reverse gear and a reverse idler gear, said extension housing and gears being so arranged as to provide a compact assembly.

A further object of this invention is to provide a transmission of the class described in which lubricating fluid is maintained adjacent the rear seal on the output shaft of the transmission.

Another object of this invention is to provide a transmission such as described having an interlock device for preventing the engagement at one time of more than one of the first, second, third and fourth gear ratios.

Still another object of this invention is to provide a transmission of the type described which is economical in construction and efficient in operation.

Other objects and advantages of this invention will become apparent as the description progresses.

BRIEF DESCRIPTION OF THE DRAWINGS

In the accompanying drawings, in which one of various possible embodiments of this invention is illustrated.

FIG. 3 is a section taken along line 3—3 of FIG. 2;

FIG. 4 is an enlarged fragmentary section taken along line 4—4 of FIG. 1;

FIG. 5 is a fragmentary side elevation view taken from the right-hand side of FIG. 4;

FIG. 6 is a section taken along line 6—6 of FIG. 2; and

FIG. 7 is a fragmentary section taken generally along line 7—7 of FIG. 4.

Like parts are indicated by corresponding characters throughout the several views of the drawings.

DESCRIPTION OF THE PREFERRED EMBODIMENT

Figure 1:
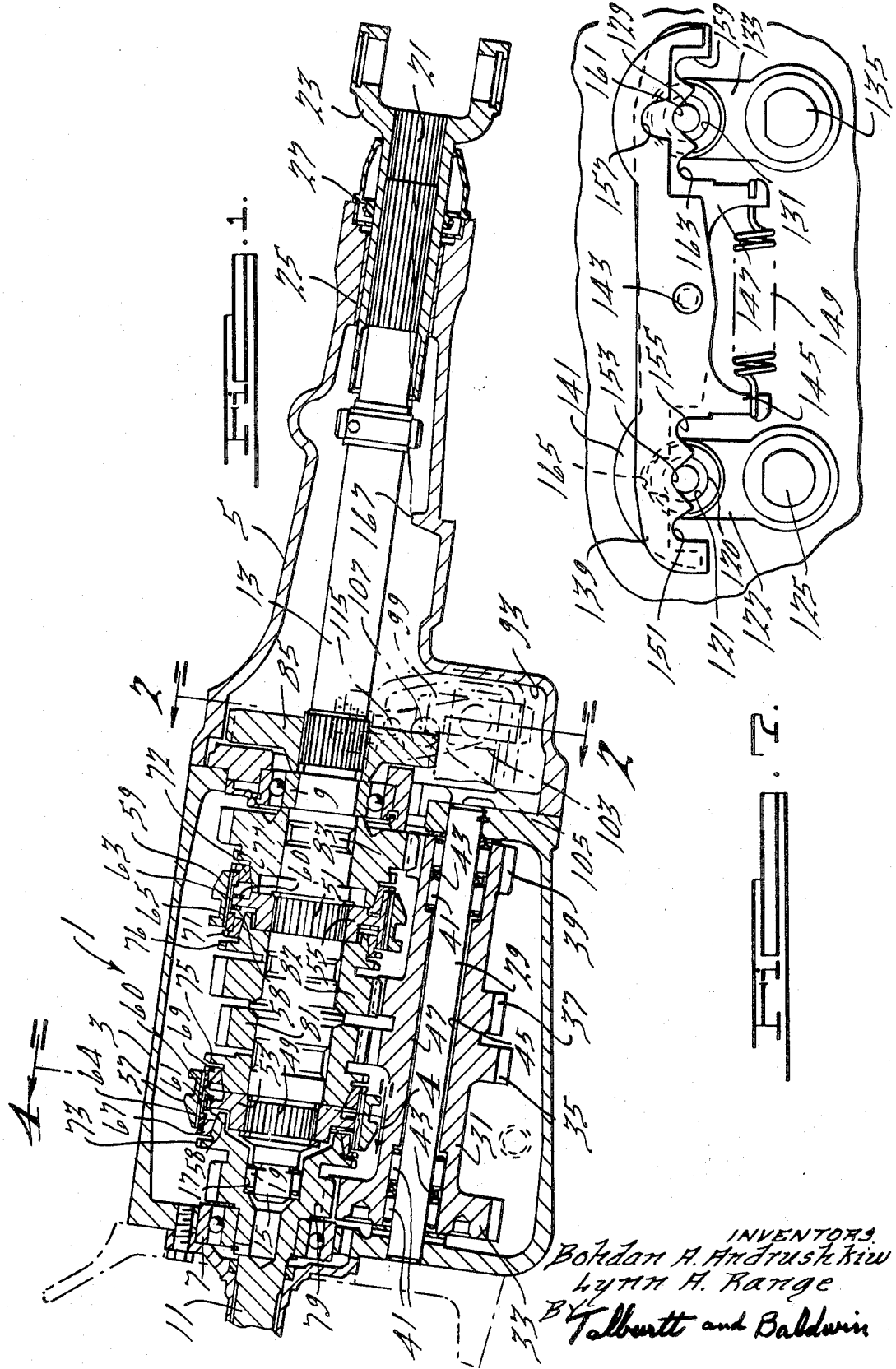
FIG. 1 is a side elevation of a preferred embodiment of this invention, certain portions being broken away and shown in section for clarity.

Referring now to the drawings, a transmission of this invention is generally indicated at 1. It comprises a case 3 and extension housing 5. These components are normally mounted in a vehicle on an inclined axis, the angle of incline being 3° to 5°, for example. Coaxially situated within the case 3 are bearing assemblies 7 and 9 which respectively serve to journal one end of a transmission input shaft 11 and a main or output shaft 13. The innermost end 15 of shaft 13 is piloted within a suitable bore 17 of input shaft 11 as by bearings 19. The outermost or rear end 21 of shaft 13 is mounted in a yoke 23 rotatably received in the rearward end of extension housing 5 by means of a bushing 25. A seal 27 is provided between the yoke 23 and the extension housing.

A countershaft 29, suitably journaled in case 3, rotatably supports a gear cluster 31 comprised of gears 33, 35, 37 and 39. Cluster 31 may be supported on countershaft 29 by a plurality of bearings 41 axially separated by washers 43. The bore 45 in cluster 31 through which countershaft 29 passes is counterbored at its ends to receive the bearings 41, the counterboring providing a centrally located elongated integral spacer 47 between the bearings.

Splined portions 49 and 51, formed on mainshaft 13, slideably receive hubs or clutches 53 and 55 by internally formed splines. Clutch sleeves 57 and 59 are slidingly engaged with external splines 61 and 63 formed on the periphery of hubs 53 and 55. Springs 58 and 60 urge struts 64 and 65 outwardly against the clutch sleeves. Synchronizing rings 67, 69, 71 and 72 are provided and cooperate with the struts 64, 65 to permit the clutch sleeves 57 and 59 to be selectively and synchronously engaged with any of the clutch teeth 73, 75, 76 and 77 of gears 79, 81, 82 and 83, respectively.

Gear 79, a direct drive or fourth speed gear, is in constant mesh with gear 33 of gear cluster 31, the third speed gear 81 is in constant mesh with gear 35, the second speed gear 82 is in constant mesh with gear 37, and the low or first speed gear 83 is in constant mesh with gear 39. Gears 81, 82 and 83 are freely rotatable on mainshaft 13.

Figure 2:
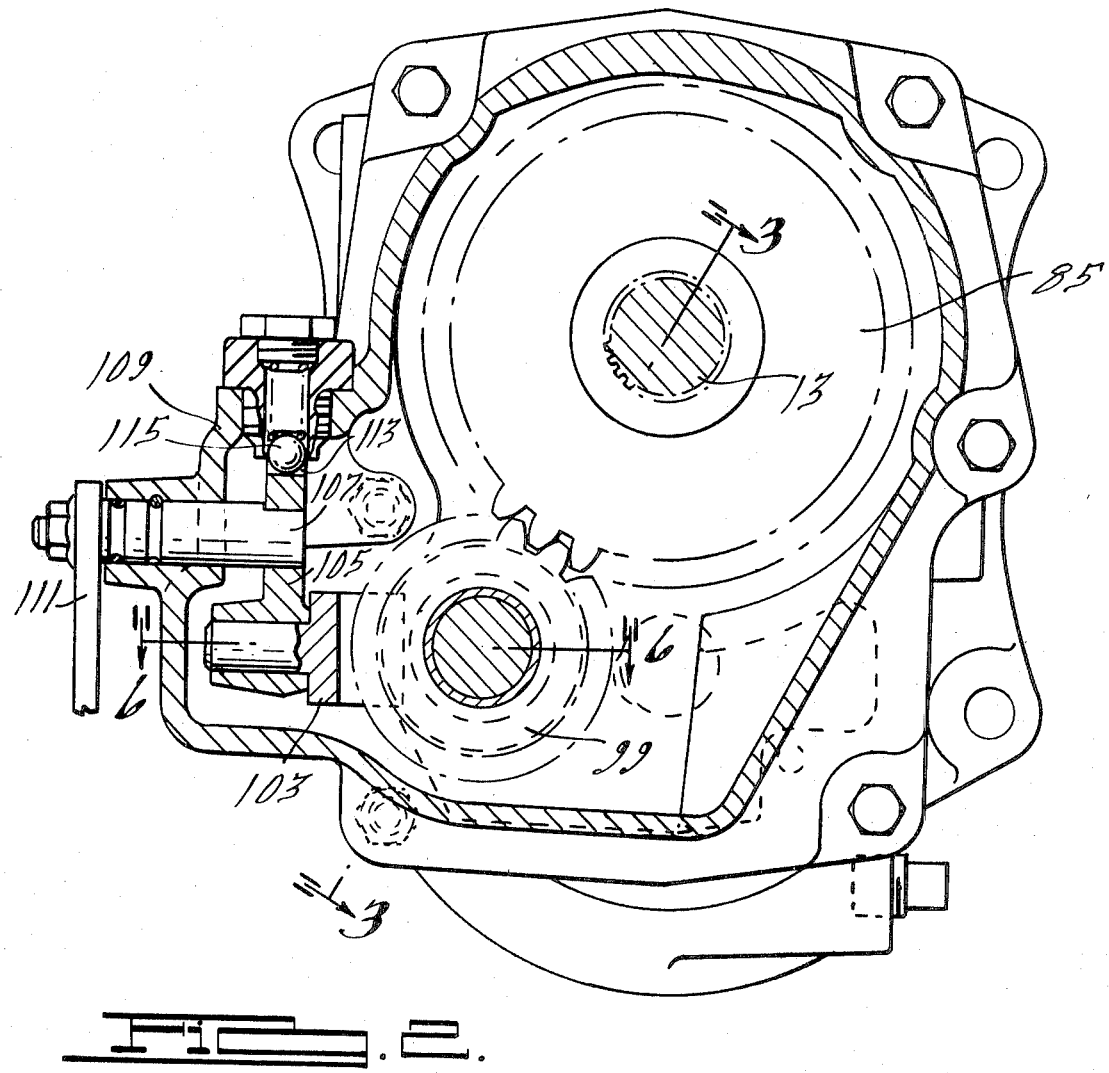
FIG. 2 is an enlarged section taken along line 2—2 of FIG. 1.

A reverse gear 85 is splined to main shaft 13 rearwardly of the bearing 9 in the extension housing 5. A reverse idler shaft 87 has one end thereof mounted in a flange 89 on the inside of case 3 and the other end mounted in a wall portion 91 formed by a cupped recess 93 in extension housing 5. Mounted on shaft 87 is an idler member 95 having a first reverse idler gear 97, a portion of which is in constant mesh with gear 39 and a second reverse idler gear 99 spaced axially from gear 97. Member 95 is rotatably mounted on shaft 87 by bearings 101. The cupped recess 93 forms a pocket for the gear 99. Movement of the idler member 95 to the left as viewed in FIG. 3 causes gear 99 to mesh with reverse gear 85. During such leftward movement gear 97 remains in mesh with gear 39. The idler member is adapted to be moved to the left as viewed in FIG. 3 by an actuating fork 103 (FIG. 2) connected to a lever arm 105 attached to a shaft 107 mounted in a wall portion 109 of extension housing 5. A lever 111 is connected to the outer end of shaft 107 for rotating the same. Lever arm 105 has detent recesses 113 in the upper end thereof in which a spring-biased detenting ball 115 is adapted to be seated. By forming the extension housing 5 to provide the cupped recess 93 for receiving the movable idler gear 99, the housing may have a relatively small configuration close to the reverse gear 85 since the latter is not shiftable along the axis of the shaft 13, i.e., the cross-sectional area of the housing may be reduced immediately rearward of the gear 85 and this reduces the weight and cost of the extension housing 5.

The apparatus for shifting through the forward speed ratios includes a shift fork 117 received in a shallow groove 119 in clutch sleeve 57. Fork 117 has rearwardly extending pin 120 which is recessed in a U-shaped recess 121 in a rocker arm 122. A cross-shaft 123 extends through a hole 124 in fork 117 to confine the movement of the fork to a straight line axial movement. The shift fork 117 is adapted to move third and fourth speed clutch sleeve 57 axially so as to engage the clutch teeth 73 of fourth speed gear 79 or the clutch teeth 75 of the third speed gear 81. As will be made apparent, confining the movement of the fork 117 to a straight line, as opposed to an arcuate movement, means the groove 119 in sleeve 57 to be relatively shallow, thereby allowing the inside dimension of the sleeve to be greater. This in turn permits the clutch teeth gear portions 73 and 75 of the gears 79 and 81 to have larger diameters, thus increasing the capacity of the transmission in both speed ranges.

Rocker arm 122 is pivotally supported by and secured to a rocket shaft 125 journaled in casing 3. An actuating or control arm (not shown) is connected to the outer end of shaft 125 for rotating the latter.

A second shift fork 126 is received in a shallow groove 127 in sleeve 59. Fork 126 has a rearwardly extending pin 129 which is received in a U-shaped recess 131 in a rocker arm 133. Fork 126 is confined to a straight line movement by shaft 123 in the same manner as fork 117. The shift fork 126 is adapted to move first and second speed clutch sleeve 59 axially so as to engage the clutch teeth 76 of second speed gear 82 or the clutch teeth 77 of the first speed gear 83. Rocker arm 133 is pivotally supported by and secured to a rocker shaft 135 journaled in casing 3. An actuating or control arm (not shown) is connected to the outer end of shaft 135 for rotating the latter. Since the fork 126 is confined to a straight line movement, the same advantages regarding increased capacity are attained as with the third and fourth speed range apparatus.

A spring-loaded interlocking device is provided in casing 3. Device 137 comprises a pair of substantially identical levers 139 and 141 pivotally mounted on a pin 143. Each lever has a downwardly extending arm 145 and 147 between which a spring 149 extends. Spring 149 biases lever 139 counterclockwise and lever 141 clockwise as viewed in FIG. 7. Lever 139 has three notches in the lower edge of one end thereof, the notches or recesses being identified as a fourth speed notch 151, a neutral notch 153 and a third speed notch 155. A locking notch 157 is provided in the other end of the lever 139. Lever 141 has three notches in the lower edge of one end thereof, the notches being identified as a first speed notch 159, a neutral notch 161 and a second speed notch 163. A locking notch 165 is provided in the other end of lever 141. Pins 120 and 129 extend into the notches in levers 139 and 141 as will be described.

The internal portion of the extension housing 5 just rearwardly of the casing 3 is so constructed that the bottom thereof has a flange extending upwardly toward output shaft 13. This flange provides a dam 167 since the axis of the shaft 13 is inclined, which dam serves to maintain a supply of lubricant adjacent the rearward end of the extension housing 5 around bearing 27. The provision of this dam 167 insures that an adequate supply of lubricant is maintained adjacent bearing 27.

Operation of the apparatus is as follows:

Assuming the transmission is in a neutral position, i.e., the position shown in FIG. 1, a first speed drive condition is obtained by rotating shaft 135 clockwise as viewed in FIG. 7. This causes rocker arm 133 to rotate clockwise as viewed in FIG. 7. In so moving, the pin 129 cams the lever 141 counterclockwise to drop notch 165 over pin 120 and prevent inadvertent movement of the latter. As the fork 126 is moved to the left as viewed in FIG. 5, the speeds of the shaft 11 and the shaft 13 are synchronized due to the action of ring 72 and struts 65 and the sleeve positively couples the shaft to the gear. When the sleeve is moved completely to the position wherein gear 83 and the shaft 13 are coupled, the pin 129 will be aligned with notch 159 and the lever 141 will drop onto the pin 129. In such position the pin 129 is against the lower surface of the lever 139 and thus prevents clockwise movement of the latter. This, in turn, prevents any substantial movement of pin 120 and consequently shaft 125 and fork 117.

The transmission is shifted from the first speed condition to a second speed condition by counterclockwise movement of shaft 135. Counterclockwise movement of shaft 135 causes rocker arm 133 to shift fork 126 to the right as viewed in FIG. 5, thus coupling gear 82 with output or mainshaft 13 through the synchronizing elements 71, 65 and the clutch teeth of gear 76 which mesh with the internal teeth of sleeve 59.

The transmission is shifted from a second speed condition to a third speed condition by clockwise movement of shaft 125 as viewed in FIG. 7. However, the pin 120 cannot be moved until pin 129 is moved back into alignment with locking notch 157. Movement of fork 117 to the left as viewed in FIG. 5 causes the gear 81 to be coupled with the shaft 13. The transmission is placed in fourth or direct drive by rotating the shaft 125 counterclockwise as viewed in FIG. 7. This causes the gear 79 to be coupled to output shaft 13. The interlock device 137 operates in a manner similar to that described above to prevent the engagement or coupling of more than one gear to the shaft 13.

The transmission is placed in reverse by bringing the input shaft 11 to a stop (applying clutch and brake pedals, not shown) and moving shaft 107 clockwise as viewed in FIG. 1. This swings second reverse idler 99 into mesh with the reverse gear 85. When the lever arm 105 swings clockwise as viewed in FIG. 1, a backup switch 169 is actuated.

The dam 167, due to the inclination of the axis of the mainshaft 13, prevents the escape of a supply of lubricant for the bearing 27. If the dam 167 were not utilized, a considerable greater amount of lubricant would have to be maintained in extension housing 5 to provide adequate lubrication of the bearing 27.

Although only one embodiment of the invention has been disclosed and described, it is apparent that other embodiments and modifications of the invention are possible.

We claim:

1. In a multiple speed power transmission mechanism having a main housing means, extension housing means attached to said main housing means, a power input shaft, a power output shaft, a direct drive gear connected to said power input shaft, a cluster gear assembly having a first gear portion meshed with said direct drive gear, and second, third and fourth gear portions thereon, first, second, and third gears freely journaled on said power output shaft, a reverse gear connected to said output shaft in said extension housing, an idler shaft mounted in said main housing means and said extension housing means, an idler member mounted on said idler shaft and having a first reverse idler gear in constant mesh with one of said gear portions, a second reverse idler gear connected to said first reverse idler gear and movable into mesh with said reverse gear, said first and second gears being in constant mesh with said first and second gear portions, said third gear being in constant mesh with said third gear portion and said first reverse idler gear portion being in constant mesh with said first gear portion, a first manually axially positionable clutch member adapted for manual actuation to positions in which driving engagement is achieved between said first gear and said power output shaft or driving engagement is achieved between said second gear and said power output shaft, a second manually axially positionable clutch member adapted for manual actuation to positions in which driving engagement is achieved between said third gear and said power output shaft or driving engagement is achieved between said direct drive gear and said power output shaft, interlock means mounted in said housing means for preventing simultaneous engagement of more than one of said direct drive, first, second and third gears with said power output shaft, said housing including bearing means for supporting the rearward end of said output shaft, said housing means including dam means for inhibiting the flow of lubricant adjacent said bearing means forwardly from the rearward portion of said housing means, said first and second clutch members having grooves therein, forks adapted to extend into said grooves, and means for moving said forks in a generally axial direction for moving said clutch members.

2. In a multiple speed power transmission mechanism having a main housing means, extension housing means attached to said main housing means, a power input shaft, a power output shaft, a direct drive gear connected to said power input shaft, a cluster gear assembly having a first gear portion meshed with said direct drive gear, and second, third and fourth gear portions thereon, first, second, and third gears freely journaled on said power output shaft, a reverse gear connected to said output shaft in said extension housing, an idler shaft mounted in said main housing means and said extension housing means, an idler member mounted on said idler shaft and having a first reverse idler gear in constant mesh with one of said gear portions, said idler member having a second reverse idler gear movable into mesh with said reverse gear, said first and second gears being in constant mesh with said first and second gear portions, said third gear being in constant mesh with said third gear portion and said first reverse idler gear portion being in constant mesh with said first gear portion, a first manually axially positionable clutch member adapted for manual actuation to positions in which driving engagement is achieved between said first gear and said power output shaft or driving engagement is achieved between said second gear and said power output shaft, a second manually axially positionable clutch member adapted for manual actuation to positions in which driving engagement is achieved between said third gear and said power output shaft or driving engagement is achieved between said direct drive gear and said power output shaft, interlock means mounted in said housing means for preventing simultaneous engagement of more than one of said direct drive, first, second and third gears with said power output shaft, said housing including bearing means for supporting the rearward end of said output shaft, said housing means including dam means for inhibiting the flow of lubricant adjacent said bearing means forwardly from the rearward portion of said housing means, said clutch members having grooves therein, a first fork adapted to extend into the groove in said first clutch member and a second fork adapted to extend into the groove of said second clutch member, manually operable means for moving said clutch means, and means for confining the movement of said clutch members to a substantially straight line.

3. A transmission mechanism as set forth in claim 2 wherein said extension housing has a pocket in which one end of said reverse idler member is located, the cross section of the upper portion of said extension housing adjacent but rearwardly of said reverse gear being smaller than the cross section of the upper portion of said housing adjacent said reverse gear.

4. A multiple speed transmission mechanism comprising a casing, power input and power output shafts concentrically journaled in said casing, a cluster gear assembly rotatably journaled in said casing about an axis parallel to the axes of said input and output shafts, a first speed gear fixedly secured to said input shaft for forced rotation therewith, a driven gear formed on said cluster assembly continually in meshed engagement with said first speed gear, a first speed forward drive gear freely rotatably journaled on said output shaft, a second speed forward drive gear freely rotatably journaled on said output shaft and located adjacent said low-speed gear, a third speed forward drive gear freely rotatably journaled on said output shaft, a first generally axially directed splined portion formed on said output shaft intermediate said first speed forward drive gear and second speed forward drive gears, an internally splined first hub member received on said first splined portion, a first shifter fork having a yoke, a first clutch sleeve, first peripheral axially directed splines formed on said hub adapted to slidingly engage internally formed splines of said first clutch sleeve, a circumferential groove formed in said first clutch sleeve for receiving therein at least a part of said yoke of said first shifter fork, first clutch teeth on said first speed forward drive gear, second clutch teeth on said second speed forward drive gear, a second generally axially directed splined portion formed on said output shaft, said third speed gear being freely rotatably journaled on said output shaft axially intermediate said second speed gear and said second splined portion, an internally splined second hub member received on said second splined portion, second axially directed splines formed peripherally on said second hub and adapted to slidingly engage internally formed splines of a second clutch sleeve, a second shifter fork having a yoke, a circumferential groove formed in said second clutch sleeve for at least partly receiving therein the yoke of said second shifter fork, a low-speed cluster gear in said cluster assembly in continuous meshed engagement with said first speed forward gear, a second speed cluster gear in said cluster assembly in continuous meshed engagement with said second speed forward gear, a third speed cluster gear in said cluster assembly in continuous meshed engagement with said third speed forward drive gear, a manual shift control means for moving said shifter forks, said shift control means comprising a pair of shift arms pivotally mounted on said casing at spaced parallel axes, each shift arm being rotatable from a neutral position to a shift position, locking members movable by the arms, a pair of stamped plate interlock levers each having a central pivot, and on one side of said pivot an edge surface, a locking recess extending therefrom into the lever, a spring anchor, and at the other side of said pivot a neutral recess and a shift position recess extending inwardly from the edge of the lever, said levers being pivotally mounted on said support between said spaced parallel axes and located in opposite relationship with a locking recess on one lever and the neutral and shift position recesses on the other lever being engageable with each locking member, a tension spring attached to said spring anchors biasing both levers to urge the neutral and shift position recesses into engagement with the cooperating locking member to resiliently hold the cooperating locking member in each position, each locking member on movement from the neutral position to the shift position engaging one interlock lever between the neutral and shift position recesses and rotating the one interlock lever to move the locking recess at the other end into engagement with the other locking member to hold said other locking member in neutral position and said edge surface preventing rotation of the one interlock lever and locking member when the other locking member is not in the neutral position, and a shaft extending through said shifter forks for confining the movement thereof to a generally straight line.

* * * * *